United States Patent
Yao et al.

[11] Patent Number: 5,938,734
[45] Date of Patent: Aug. 17, 1999

[54] REAL TIME STREAM SERVER FOR HANDLING A PLURALITY OF REAL TIME STREAM DATA WITH DIFFERENT DATA RATES

[75] Inventors: Hiroshi Yao; Tatsunori Kanai; Toshiki Kizu, all of Kanagawa; Seiji Maeda, Tokyo, all of Japan

[73] Assignee: Kabushiki Kaisha Toshiba, Kawasaki, Japan

[21] Appl. No.: 08/715,371

[22] Filed: Sep. 12, 1996

[30] Foreign Application Priority Data

Sep. 12, 1995 [JP] Japan ................................. 7-234404

[51] Int. Cl.$^6$ ................................................. H04L 12/56
[52] U.S. Cl. ........................... 709/232; 370/474; 709/201; 709/231
[58] Field of Search ..................... 395/200.09, 200.08, 395/497.04, 191, 182.04, 800; 370/474, 466, 61; 709/232, 201, 231; 345/439; 386/95

[56] References Cited

U.S. PATENT DOCUMENTS

| | | | |
|---|---|---|---|
| 5,524,258 | 6/1996 | Corby, Jr. et al. | 395/800 |
| 5,541,919 | 7/1996 | Yong et al. | 370/61 |
| 5,583,995 | 12/1996 | Gardner et al. | 395/200.09 |
| 5,586,264 | 12/1996 | Belknap et al. | 395/200.08 |
| 5,592,612 | 1/1997 | Birk | 395/182.04 |
| 5,652,749 | 7/1997 | Davenport et al. | 370/466 |
| 5,671,226 | 9/1997 | Murakami et al. | 370/474 |
| 5,712,976 | 1/1998 | Falcon, Jr. et al. | 395/200.09 |
| 5,717,641 | 2/1998 | Ando et al. | 395/191 |
| 5,737,577 | 4/1998 | Martini | 395/497.04 |
| 5,806,804 | 9/1998 | Laursen et al. | 709/201 |
| 5,812,144 | 9/1998 | Potu et al. | 345/439 |
| 5,841,941 | 11/1998 | Morimoto et al. | 386/95 |

*Primary Examiner*—Frank J. Asta
*Assistant Examiner*—Thong Vu
*Attorney, Agent, or Firm*—Foley & Lardner

[57] ABSTRACT

A real time stream server capable of realizing a supply of a plurality of real time stream data with different data rates by a scheduling scheme using constant time-slot interval and transfer start timing period. A number of unit streams to be used and a block transfer time for each real time stream data are determined according to a data rate of each real time stream data. Each real time stream data is divided into a plurality of blocks, each block being in a size to be transferred within the block transfer time, and the blocks are sequentially distributed among the unit streams to be used. The blocks of each unit stream data are sequentially stored into a plurality of disk devices. In response to a request for each real time stream data from a client, the blocks constituting each real time stream data are read out from disk devices to a buffer memory, and each real time stream data is read out from a buffer memory and transferred to the client through a network, according to an appropriately scheduled transfer start timing for each unit stream.

24 Claims, 10 Drawing Sheets

REAL TIME STREAM SERVER FOR HANDLING A PLURALITY OF REAL TIME STREAM DATA WITH DIFFERENT DATA RATES

BACKGROUND OF THE INVENTION

1. Field of the Invention

The present invention relates to a real time stream server for supplying a plurality of real time stream data in different data rates simultaneously to clients, and a method for operating the real time stream server.

2. Description of the Background Art

Data to be sequentially transferred in real time such as video data and audio data are generally called "real time stream data". For a real time stream server for handling such real time stream data, a necessary condition is that it should be able to transfer the real time stream data stored in disk devices to each client while guaranteeing a continuity in real time.

In order to satisfy this condition, in the prior art, the real time stream data are stored in disks by being divided into blocks of a size to be transferred in a prescribed period of time, and the server makes accesses to disks periodically for each stream. The read out blocks are stored in a buffer memory once, and periodically transferred to corresponding clients through a communication network.

A stream scheduling device is a device which realizes a management of timings for issuing disk access commands and data transfer commands in this operation.

In addition, the scheduling device establishes a new stream channel upon receiving a connection request from a user. In order to manage disk accesses and data transfer timings, the scheduling device provides time-slots as shown in FIG. 1 which are partitioned at constant time interval. One disk access is allocated to one time-slot, and one disk access reads out one block of the real time stream data. A period of disk access in one stream is constant, so that by allocating disk accesses of different streams to different time-slots, it becomes possible to share the same stored data among a plurality of streams.

In an example shown in FIG. 1, four time-slots are provided in one period. That is, three disk devices with a read multiplexing level 4 are provided, and blocks are striped over these three disk devices. Consequently, an access period for one disk device is 4×3=12 time-slots, and a maximum number of simultaneously connectable streams is 12.

As shown in FIG. 1, time-slots by which one stream makes accesses to the disk devices are distanced from each other by the access period of four time-slots. For example, after a read block A1 (a block-1 of the real time stream data A) is read out, it is transferred to a client-0 and processed (e.g., reproduced) in real time, and then a block A2 is read out and transferred before the processing of a block A1 is finished. In this manner, the scheduling is made so that each stream does not influence the continuity of the other streams.

FIG. 1 shows an exemplary case of a scheme in which the disk access allocated to the time-slot is fixed, but there is also a scheme in which an allocation position of a disk access is made variable among time-slots within a tolerable jitter range, by noting the fact that a time-slot to which a disk access is to be allocated can be changed during a period since a buffer memory becomes available until a transfer start timing (see, Japanese Patent Application No. 7-57384 (1995)). Here, a range of time-slots to which a disk access of one stream can be allocated is called tolerable jitter range of that stream.

FIG. 2 shows an exemplary tolerable jitter range. In a case where all the real time stream data to be handled have the same data rate, the scheduling becomes easier by a scheme utilizing the tolerable jitter range.

Now, in a case of handling real time stream data with a higher data rate, a block size becomes larger, and there can be a case in which a reading from a disk cannot be completed within one time-slot.

In order to avoid such a situation, if a time-slot interval and a block size are fixedly set in accordance with the real time stream data with the maximum data rate, there arises a problem in a case where real time stream data with a low data rate are to be supplied at the same time because it would become impossible to take a full advantage of a transfer capacity of the disk devices. This is due to the fact that, for the same period, the block size changes in proportion to the data rate.

On the other hand, when a time-slot interval is varied according to a block size, it becomes difficult to realize a flexible disk access scheduling in which orders of disk accesses can be interchanged. In addition, the buffer memory management becomes complicated in such a case, because there is a need to secure a continuous region in a size of each block size as the buffer memory.

Moreover, when a block size is fixed regardless of a data rate, a period of access to one disk device is going to be different for different streams, and for this reason, it becomes difficult to judge whether it is possible to connect a new stream while guaranteeing the continuity of the already connected streams.

Thus, in a case of supplying a plurality of real time stream data with different data rates, it has conventionally been difficult to realize both a scheme for making the disk access scheduling easier by fixing a period of access to one disk device and a time-slot interval, and a scheme for taking a full advantage of a transfer capacity of disk devices by changing a number of data supply streams according to a data rate.

SUMMARY OF THE INVENTION

It is therefore an object of the present invention to provide a real time stream server and a method for operating a real time stream server, capable of realizing a supply of a plurality of real time stream data with different data rates by a scheduling scheme using constant time-slot interval and transfer start timing period, without wasting a transfer capacity of disk devices.

According to one aspect of the present invention there is provided a real time stream server, comprising: entering means for entering real time stream data to be stored in the real time stream server; determining means for determining a number of unit streams to be used and a block transfer time for the real time stream data, according to a data rate of the real time stream data; dividing means for dividing the real time stream data into a plurality of blocks, each block being in a size to be transferred within the block transfer time, and sequentially distributing the blocks among as many unit streams as the number of unit streams to be used; a plurality of disk devices for sequentially storing the blocks of each unit stream data; a buffer memory for temporarily storing the blocks read out from said plurality of disk devices; control means for reading out the blocks constituting the real time stream data from said plurality of disk devices to the buffer memory, and reading out the real time stream data from the buffer memory, according to a request for the real time stream data from a client; and transfer means for transferring the real time stream data read out from the buffer memory to the client through a network.

According to another aspect of the present invention there is provided a method for operating a real time stream server having a plurality of disk devices and a buffer memory, comprising the steps of: entering real time stream data into the real time stream server; determining a number of unit streams to be used and a block transfer time for the real time stream data, according to a data rate of the real time stream data; dividing the real time stream data into a plurality of blocks, each block being in a size to be transferred within the block transfer time, and sequentially distributing the blocks among as many unit streams as the number of unit streams to be used; sequentially storing the blocks of each unit stream data into said plurality of disk devices; controlling the real time stream server to read the blocks constituting the real time stream data from said plurality of disk devices to the buffer memory, and read out the real time stream data from the buffer memory, according to a request for the real time stream data from a client; and transferring the real time stream data read out from the buffer memory to the client through a network.

Other features and advantages of the present invention will become apparent from the following description taken in conjunction with the accompanying drawings.

DETAILED DESCRIPTION OF THE PREFERRED EMBODIMENTS

Figure 1:
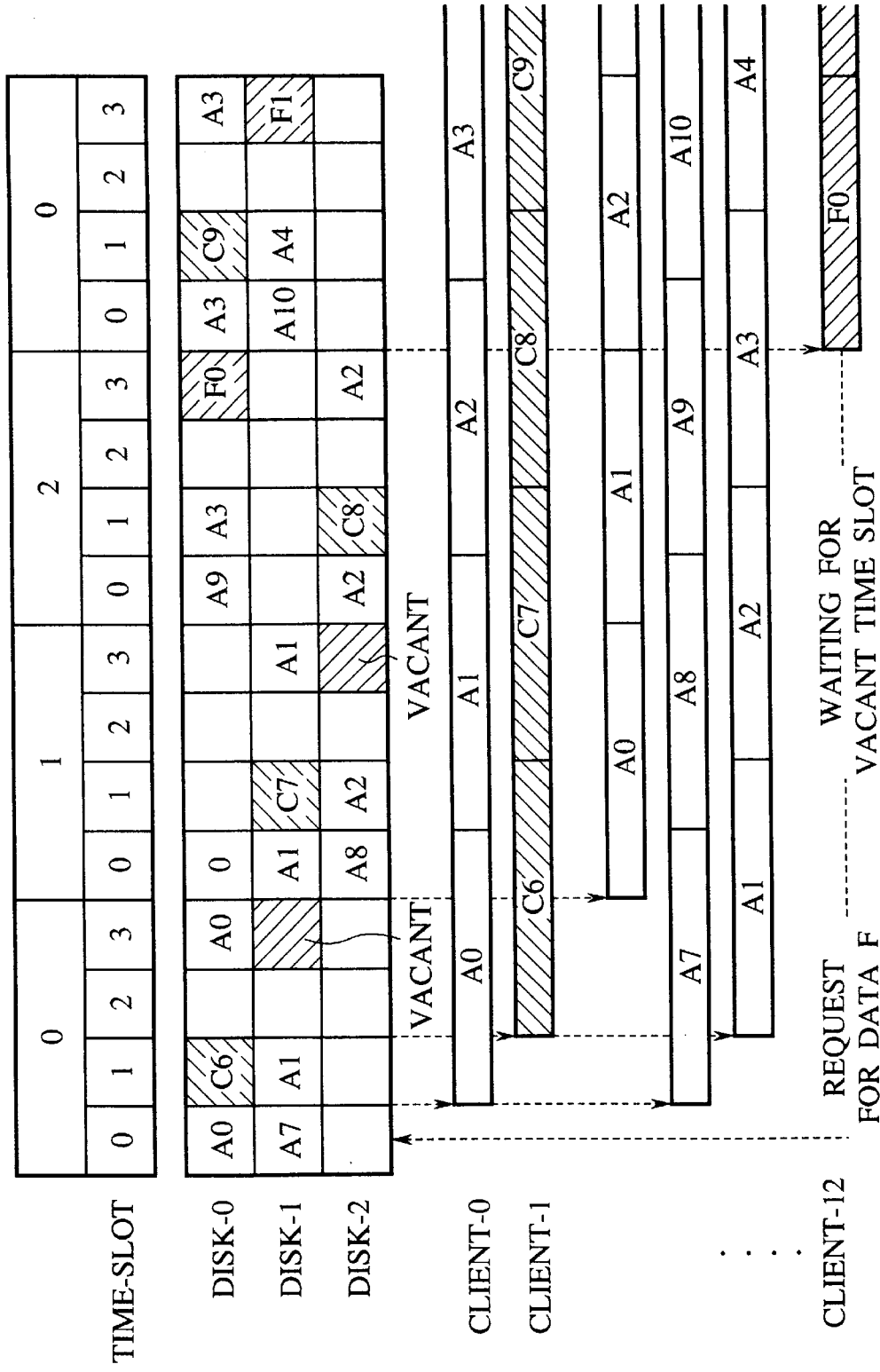
FIG. 1 is a timing chart showing one conventional scheme for managing disk accesses and data transfer timings in a stream scheduling device.

First, the main features of a real time stream server according to the present invention will be summarized briefly.

In the present invention, a unit stream having a reference data rate is defined. Then, in a case of supplying real time stream data in excess of the data rate of the unit stream, as many unit streams as necessary for the required data rate are used to supply this real time stream data.

At first, the real time stream data is divided into unit streams, and stored into a plurality of disk devices. Namely, according to a data rate of entered real time stream data, a number of unit streams to be used and a block transfer time are determined. Then, the real time stream data is divided into a plurality of blocks, each in a size to be transferred with the block transfer time, and these blocks are sequentially allocated to unit stream data. Then, for each unit stream data, allocated blocks are stored by distributing them over a plurality of disk devices sequentially from a top block. Also, for each real time stream data, a number of unit streams to be used, an ID number of a disk device which stores the top block of each unit stream, and a recording position of each block on a disk device which stores that block are recorded.

When a request for this real time stream data so stored in the disk devices is received from a client, stream recourses for as many unit streams as a recorded number of unit streams to be used for the requested real time stream data are secured (reserved), and a transfer start timing of each unit stream is scheduled so that the blocks are transferred continuously in an order as in the original real time stream data. At this point, the transfer start timings of the unit streams are scheduled to be displaced one another by a block transfer time part.

In transferring each block, a corresponding block on the buffer memory is transferred within the block transfer time starting from the transfer start timing scheduled for each unit stream. Here, the transfer start timings of the unit streams are displaced one another by a block transfer time part, so that when the block transfer of a preceding unit stream is finished, the block transfer of a subsequent unit stream is started immediately, and the blocks of the original real time stream data are transferred while guaranteeing the continuity.

In this manner, according to the present invention, the real time stream data with various data rates can be handled by using an appropriate number of independent unit streams according to a data rate of each real time stream data, and therefore it becomes possible to realize the disk access scheduling based on a single scheme regarding a time-slot interval, a block size, a block transfer period, and a buffer memory management, without distinguishing different data rates.

Also, according to the present invention, the stream resources are divided into amounts corresponding to the unit streams, and allocated as much as necessary according to a data rate of each real time stream data to be supplied, so that it becomes possible to utilize the stream resources efficiently without wasting any resource.

Also, in a case of the real time stream server which has a capacity to supply Cmax sets of real time stream data with data rates not greater than R, where R is a reference data rate of a unit stream, a number of supplies Cm (m=1, 2, ...) to be allocated to each real time stream data with a data rate in a data rate range greater than $(m-1) \times R$ and not greater than $m \times R$ can be set arbitrarily within a range of:

$$\sum_m (m \times C_m) \leq C_{max}$$

where m is a number of unit streams to be used for each real time stream data.

Referring now to FIG. 3 to FIG. 10, one embodiment of a real time stream server according to the present invention will be described in detail.

Figure 3:
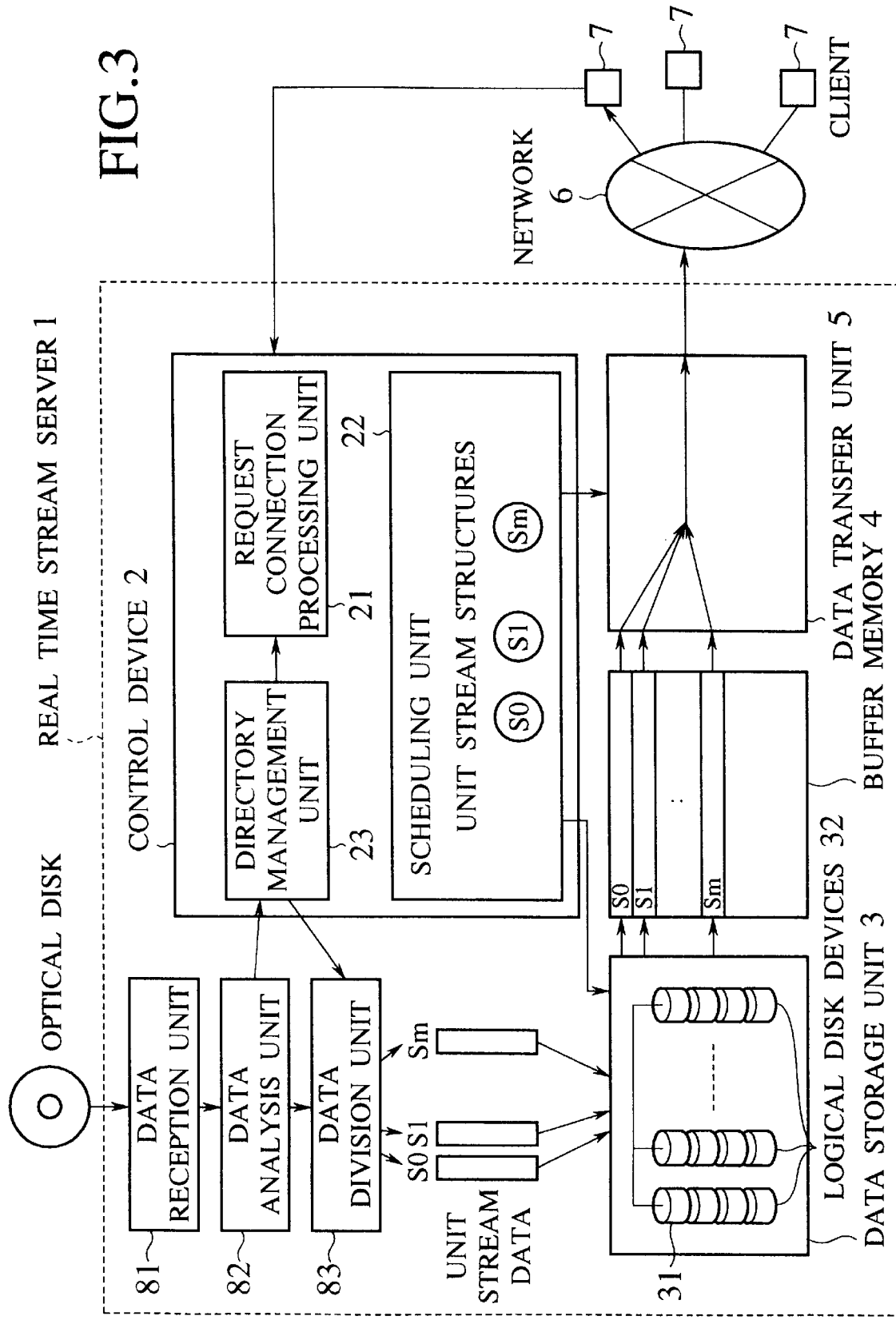
FIG. 3 is a block diagram of one embodiment of a real time stream server according to the present invention.
Figure 4:
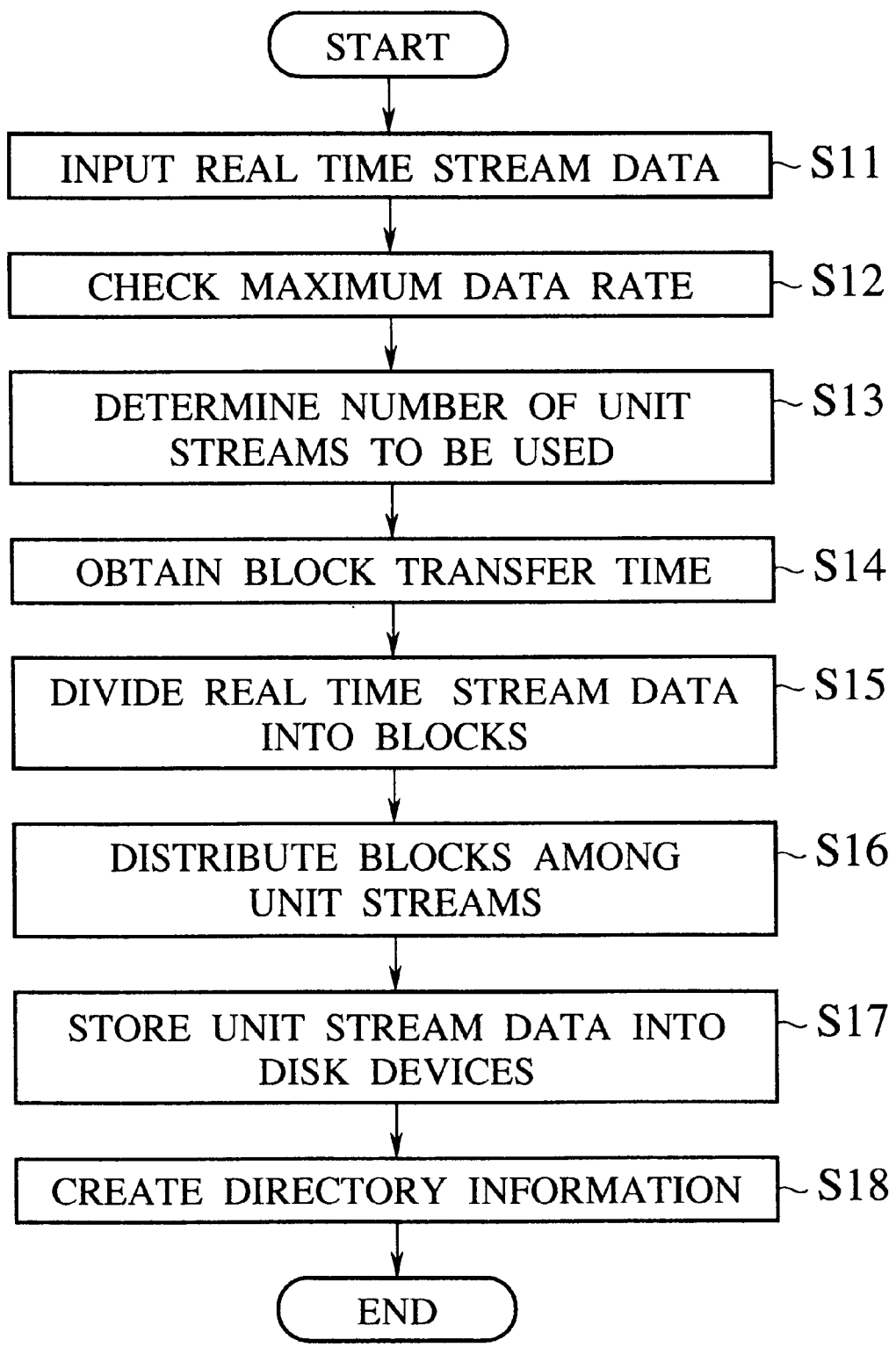
FIG. 4 is a flow chart of an operation for storing real time stream data into memory devices from external in the real time stream server of FIG. 3.
Figure 5:
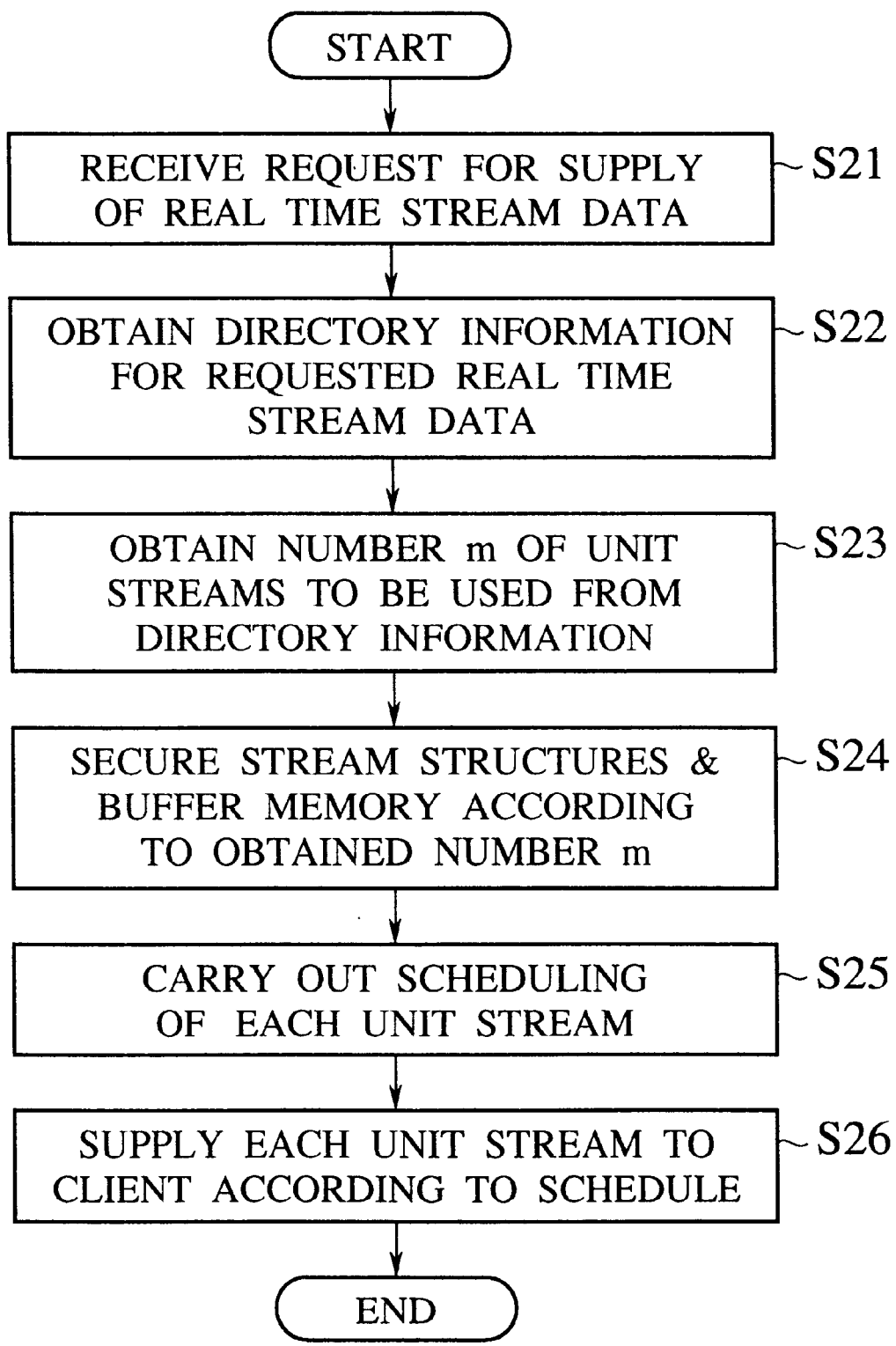
FIG. 5 is a flow chart of an operation for supplying real time stream data according to a request from external in the real time stream server of FIG. 3.

FIG. 3 shows a configuration of a real time stream server in this embodiment, FIG. 4 shows a flow chart of an operation for storing real time stream data into memory devices from external, and FIG. 5 shows a flow chart of an operation for supplying real time stream data according to a request from external.

As shown in FIG. 3, the real time stream server 1 of this embodiment comprises a control device 2, a data storage unit 3 connected with the control device 2, a buffer memory 4 connected with the data storage unit 3, a data transfer unit 5 connected with the control device 2 and the buffer memory 4 and connected to an external network 6, a data reception unit 81 for receiving externally entered real time stream data, a data analysis unit 82 connected with the data reception unit 81 and the control device 2, and a data division unit 83 connected with the control device 2 and the data storage unit 3.

The control device 2 has a request connection processing unit 21, a scheduling unit 22, and a directory management unit 23. The data storage unit 3 has a plurality of disk devices 31 for storing real time stream data in units of blocks.

First, with references to FIG. 3 and FIG. 4, one aspect of this real time stream server 1 regarding a phase for storing real time stream data acquired at the data reception unit 81 into the data storage unit 3 will be described.

Here, the "unit stream" in the real time stream server is defined as a stream which is scheduled by using a block transfer period T, a block size L, and a time-slot interval I which serve as references for the operation of the real time stream server.

The "unit data rate R" is defined as a maximum data rate that can be scheduled as a unit stream. Consequently, the following relationship holds among the block transfer period T, the block size L, and the unit data rate R.

$$L \leq R*T$$

A value of this unit data rate R is to be determined appropriately in view of optimizing the disk reading efficiency and the data transfer/storing efficiency.

Now, at a time of storing real time stream data in the real time stream server, the real time stream data to be stored is entered from the data reception unit 81 (step S11). Here, the data reception unit 81 may be in a form of reading data from an external memory device such as optical disk, floppy disk, CD-ROM, etc., or in a form of receiving data transferred through a network.

At the data analysis unit 82, a maximum data rate of the entered real time stream data is checked (step S12). To realize this checking, the maximum data rate may be obtained by analyzing a header of the real time stream data, or the maximum data rate known in advance may be entered by a human operator through an input device such as keyboard.

When the maximum data rate is obtained, a number of unit streams to be used for that real time stream data is determined (step S13). Here, a number of unit streams to be used is a numerical value indicating a capacity and resources of the real time stream server required for supplying that real time stream data, which is expressed in terms of a required number of the unit streams. Actually, a number of unit streams to be used can be determined as a minimum integer m which satisfies the following relationship.

$$(\text{Maximum data rate}) < m \times (\text{Unit data rate } R)$$

When the number of unit streams to be user is determined, the block transfer time which serves as a reference size for dividing the real time stream data into blocks is obtained according to the following formula (step S14).

$$(\text{Block transfer time}) = (\text{Block transfer period } T)/m$$

An amount of data to be transferred within this block transfer time obtained according to this formula never exceed the block size L of the unit stream.

The number of unit streams to be used and the block transfer time calculated at the data analysis unit 82 are then sent to the data division unit 83 along with the real time stream data.

At the data division unit 83, the real time stream data is divided into blocks, each in a size to be transferred within the block transfer time T/m (step S15). Then, these blocks are distributed among as many unit stream data as the number of unit streams to be used (step S16). Here, the distribution should preferably be done by using a fixed rule so that the schedules will not interfere among the unit stream data.

More specifically, for example, a set of blocks as a whole can be divided into m pieces of non-dense subsets Bj given by:

$$B_j = \{b(m \times k + j) | k = 0, 1, \ldots \} \quad (j = 0, \ldots, m-1)$$

and each such non-dense subset Bj can be identified as a unit stream data. For instance, in a case where m=4 and there are sixteen blocks b0 to b15, the blocks are distributed among four unit stream data as follows.

B0={b0, b4, b8, b12}

B1={b1, b5, b9, b13}

B2={b2, b6, b10, b14}

B3={b3, b7, b11, b15}

These m pieces of unit stream data (B0 to Bm−1) are then sent to the data storage unit 3, and each unit stream data is stored into N sets of disk devices, in a similar manner as used for a unit stream data in a case of m=1. More specifically, a top block bj of the unit stream data B0 is stored into a disk device of a disk device ID number Hj, while each block b(m×k+j) is stored into a disk device of a disk device ID number [(k+Hj) modulo N].

At this point, the disk device ID number Hj of the disk device which stores the top block of each unit stream, and a recording position of each block on a disk device which stores each block, are recorded as a directory information in the directory management unit 23 within the control device 2 (step S18).

Here, a recording position on a disk may be specified by physical cylinder number, track number, and sector number, or by a logical number that can identify a specific position.

Also, a manner of sending m pieces of unit stream data obtained at the data division unit 83 to the data storage unit 3 can be in a form of storing all the unit stream data on another memory device provided separately from the data storage unit 3 of the real time stream server and then sending each unit stream to the data storage unit 3 one by one, or in a form of sending all m pieces of unit stream data to the data storage unit 3 in parallel.

Next, with references to FIG. 3 and FIG. 5, another aspect of this real time stream server 1 regarding a phase for transferring the real time stream data to a client 7 upon receiving a request for supply of the real time stream data will be described.

Note that, generally speaking, there are two types of a scheduling scheme for allocating a time-slot to a disk access, including a fixed allocation type and a variable allocation type, and the present invention is applicable to either type of the scheduling scheme. In the following, it is only assumed that the scheduling is to be made in such a manner that the continuity of streams is guaranteed, without limiting the scheduling scheme to either one of these two types.

When a request for supply of the real time stream data is received from a client 7 through the network 6 (step S21), the request connection processing unit 21 first obtains a directory information for the requested real time stream data from the directory management unit 23 (step S22).

Then, the number m of unit streams to be used is obtained from the directory information (step S23), and as many stream structures in the scheduling unit 22 as necessary for holding information required in managing m pieces of unit streams are secured (reserved), while a necessary amount of regions in the buffer memory 4 are secured (reserved) (step S24).

Next, the scheduling unit 22 carries out the scheduling including a selection of transfer start timings for the unit streams S0 to Sm−1 to be used (step S25). Here, by the real time stream data storing procedure described above, m pieces of blocks b(m×k+j) (j=0, . . . , m−1) which are continuous in the original real time stream data are sequentially distributed among the unit streams S0 to Sm−1. Consequently, in order to carry out the transfer of these blocks continuously, the transfer start timings of the unit streams S0 to Sm−1 are displaced one another by the block transfer time T/m part.

Here however it is necessary for each one of the unit streams S0 to Sm−1 to select a time-slot for carrying out the disk access, so that it becomes possible to read out the respective top block from the disk device 31 which stores that top block, before the selected transfer start timing, without affecting the continuity of the other already connected unit streams. Note that the ID number of the disk device 31 which stores the top block of each unit stream can be obtained from the directory information obtained at the step S22. This time-slot selection operation will be described in detail below. When this condition is not satisfied, it is necessary to select different transfer start timings anew.

Each one of the unit streams S0 to Sm−1 so connected is then scheduled as an independent unit stream for which the block transfer time for one block is T/m, that is, scheduled according to the block transfer period T, the block size L, the time-slot interval I, and the block transfer time T/m. Then, according to this scheduling, each block is read out from the buffer memory 4 from the recording position of each block on a disk device which is indicated by the directory information, and supplied to the client 7 from the data transfer unit 5 (step S26).

According to this embodiment of the present invention, the real time stream data with a data rate not greater than m×R are handled as m pieces of independent unit streams, so that it becomes possible to realize the disk access scheduling based on a single scheme regarding a time-slot interval, a block size, a block transfer period, and a buffer memory management.

Also, according to this embodiment of the present invention, in a case of the real time stream server which has a capacity to supply Cmax sets of real time stream data with data rates not greater than R, a number of supplies Cm (m=1, 2, . . . ) to be allocated to each real time stream data with a data rate in a data rate range greater than (m−1)×R and not greater than m×R can be set arbitrarily within a range of:

$$\sum_m (m \times Cm) \leq Cmax$$

where m is a number of unit streams to be used for each real time stream data, as should be apparent from the above description.

Now, with references to FIG. 6 to FIG. 10, concrete examples of the real time stream server of the present invention will be described.

First, an exemplary case of the real time stream server which stores and supplies the real time stream data by using a unit stream with a unit data rate R=1.6 (Mbps) will be described.

When the block transfer time for one block is selected to be 2400 (ms), the maximum size of one block is 500 (kB). Assuming the the transfer rate of the disk device to be used is 20 (Mbps), there is a need to set the time-slot interval to be not less than 200 (ms) in order to read out one block by one time-slot.

In order to raise the transfer rate higher, one block can be divided and stored over a plurality of disk devices 31. For example, considering four disk devices 31 as one set, one block can be divided into four and stored into four disk devices 31 respectively, and at a time of reading, all of these four disk devices 31 of the same set can be accessed simultaneously. In this manner, the effective maximum block size on a disk becomes 125 (kB), and the time-slot interval of not less than 50 (ms) becomes necessary. In the following, a set of these four disk devices 31 is regarded as one logical disk device 32.

When the time-slot interval is set to be 50 (ms) by regarding a set of four disk devices as one logical disk device as described above, a number of unit streams that can be supplied by one logical disk device is 2400/50=48 pieces. In addition, when eight of such logical disk devices are provided, it becomes possible to supply 48×8=384 pieces of the unit streams.

In a case of handling the unit streams in such a real time stream server, the block bk is to be stored in the logical disk device with a logical disk device ID number [(k+H) modulo 8], where H is a logical disk device ID number of the logical disk device which stores the top block b0.

In order to supply these unit streams in accordance with the request from the client 7, the disk devices storing the block to be transferred next are accessed at a period of 2400 (ms), and the block of not greater than 500 (kB) in total is read out to the buffer memory 4, 125 (kB) from each one of four disk devices corresponding to one logical disk device, within the time-slot interval 50 (ms). This block is then transferred to the client 7 at the period of 2400 (ms) in the transfer time of 2400 (ms).

Figure 6:
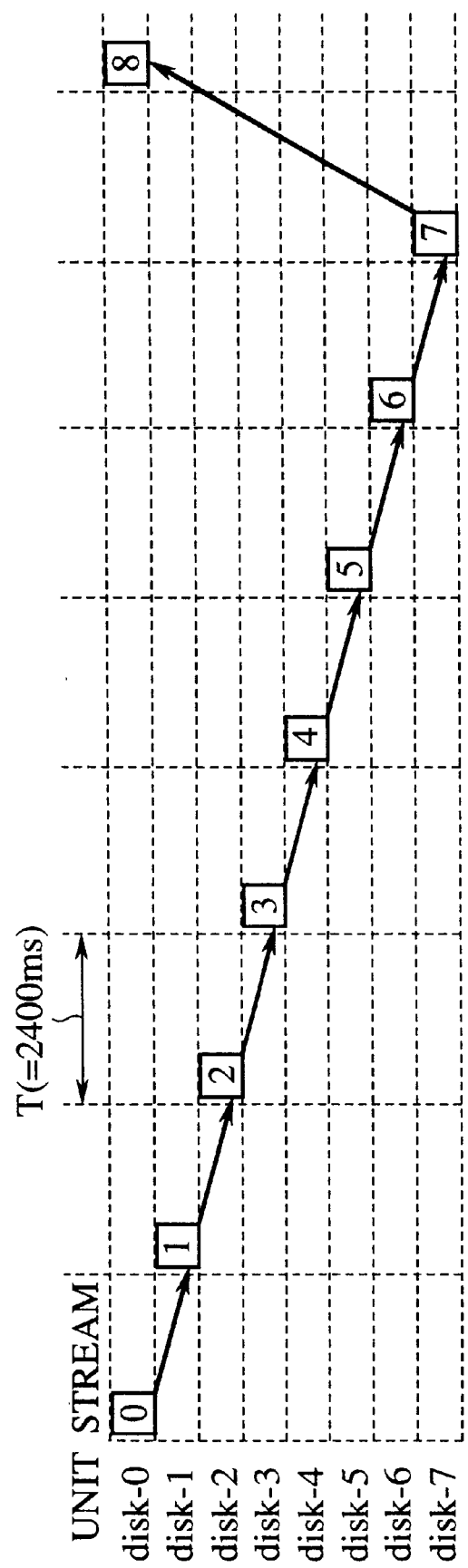
FIG. 6 is a diagram showing exemplary transfer start timings for blocks read out from logical disk devices in a concrete example of the real time stream server of FIG. 3, in a case of using one unit stream.

FIG. 6 shows exemplary transfer start timings for blocks read out from the logical disk devices storing blocks of one unit stream in this case. In FIG. 6, the top block is stored in the logical disk device-0 (disk-0). Note however that there is no need for a disk device to store the top block to be the logical disk device-0, and it is also possible to store the top block of different real time stream data in different logical disk devices.

Next, in the real time stream server of the concrete example described above, a case of handling the real time stream data with a data rate of 3 (Mbps) will be considered. Here, the minimum integer m which satisfies $3 \leq m \times R = m \times 1.6$ (Mbps) is 2, so that it is possible to store and supply the real time stream data with a date rate of 3 (Mbps) by using 2 pieces of unit streams with the block transfer time for one block equal to 1200 (ms).

In order to store the real time stream data with a date rate of 3 (Mbps), this data is divided into blocks, each in a size to be transferred in 1200 (ms), and a set of these blocks are divided into m=2 subsets:

B0=$\{b(2k)|k=0, 1, \ldots\}$

B1=$\{b(2k+1)|k=0, 1, \ldots\}$

Then, the block b(2k+j) is stored into the logical disk device with a logical disk device ID number [(k+Hj) modulo 8]. In other words, for B0, the top block b0 is stored into the logical disk device with a logical disk device ID number H0, the next block b2 is stored into the logical disk device with a logical disk device ID number [(H0+1) modulo 8], the next block b4 is stored into the logical disk device with a logical disk device ID number [(H0+2) modulo 8], and so on.

In order to supply this stream in response to the request from the client 7, two unit streams S0 and S1 for supplying B0 and B1 respectively are prepared.

Then, the reference time-slots for the unit stream S0 and the unit stream S1 are selected such that the transfer start timings of the block b0 and the block b1 are displaced by 2400/2=1200 (ms). Then, the disk access is allocated to the time-slot in a similar manner as used for a unit stream in a case of m=1, but here it must be possible to realize the disk access allocation for the unit stream S0 and the disk access allocation for the unit stream S1 simultaneously. If the simultaneous disk access allocations are impossible, the reference time-slots of the unit streams S0 and S1 are to be selected anew.

When the reference time-slots of the unit streams S0 and S1 are determined in this manner, it suffices to schedule the unit streams S0 and S1 as independent unit streams. In other words, for each one of the unit stream S0 and S1, a block to be transferred next by using the time-slot to which the disk access is allocated is read out from the logical disk device which stores this block to the buffer memory 4, and then this block is transferred to the client 7 at the period of 2400 (ms), in the transfer time of 1200 (ms). Here, only the transfer time differs from a case of a usual unit stream. A size of one block is approximately 460 (kB), which is less than the maximum block size of 500 (kB) for a usual unit stream, so that the time-slot interval and the buffer memory management can be exactly the same as in a case of a usual unit stream.

Figure 7:
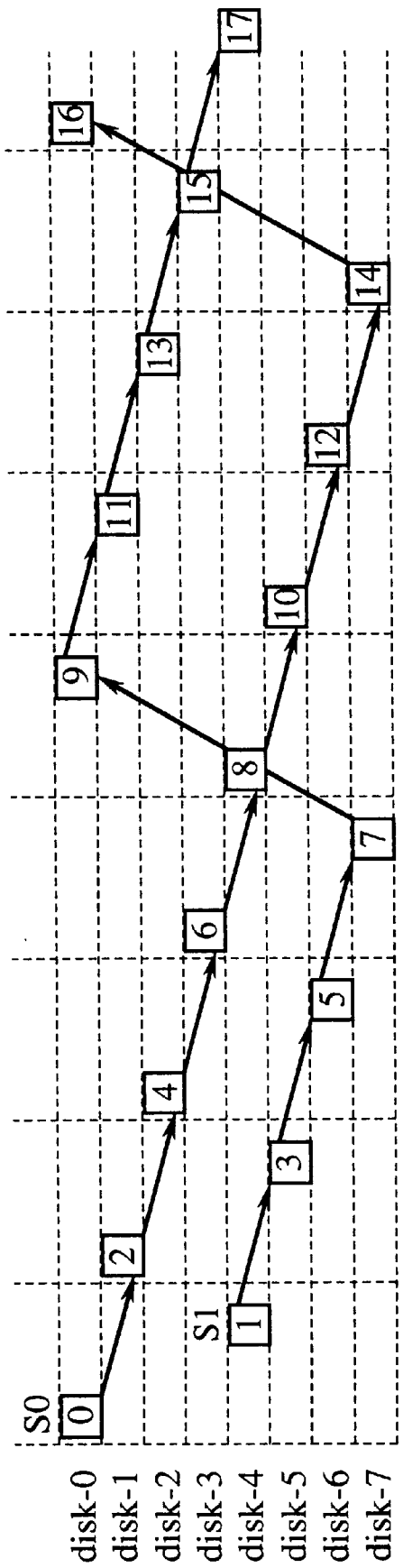
FIG. 7 is a diagram showing one exemplary transfer start timings for blocks read out from logical disk devices in a concrete example of the real time stream server of FIG. 3, in a case of using two unit streams.
Figure 8:
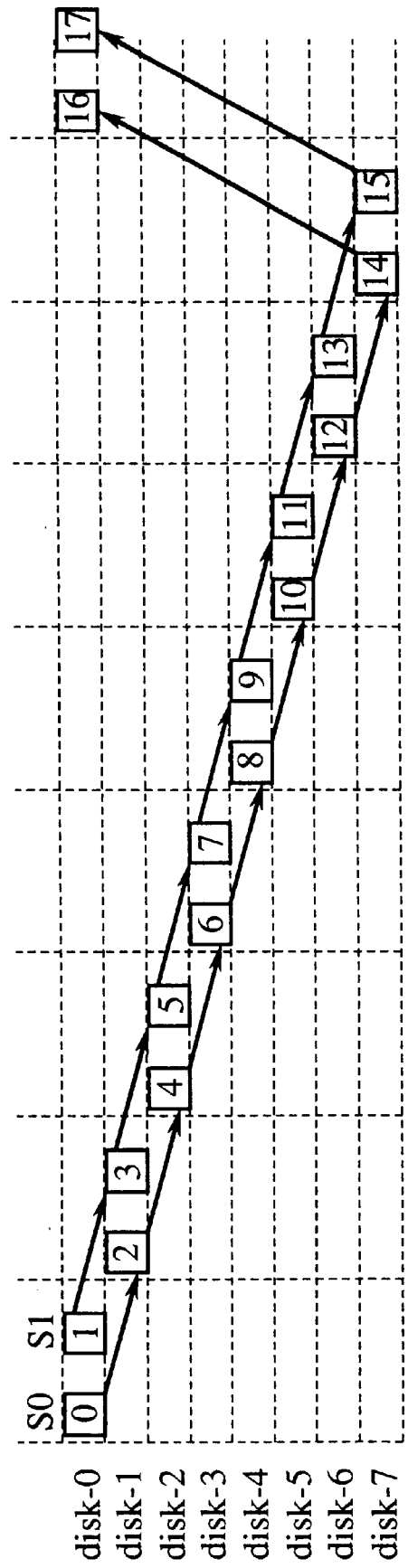
FIG. 8 is a diagram showing another exemplary transfer start timings for blocks read out from logical disk devices in a concrete example of the real time stream server of FIG. 3, in a case of using two unit streams.

FIG. 7 shows exemplary transfer start timings for blocks read out from the logical disk devices storing blocks of the unit streams S0 and S1 in this case. In FIG. 7, the top blocks of the unit streams S0 and S1 are stored in the logical disk devices with the logical disk device ID numbers H0=0 and H1=4. Note however that any other combination of the logical disk devices to store the top blocks may be used. FIG. 8 shows another exemplary transfer start timings in this case, where H0=H1=0, so that the block b0 and the block b1 are stored in the same logical disk device in this case.

Next, in the real time stream server of the concrete example described above, a case of handling the real time stream data with a data rate of 4.5 (Mbps) will be considered. Here, the minimum integer m which satisfies $4.5 \leq m \times R = m \times 1.6$ (Mbps) is 3, so that it is possible to store and supply the real time stream data with a data rate of 4.5 (Mbps) by using 3 pieces of unit streams with the block transfer time for one block equal to 800 (ms).

In order to store the real time stream data with a date rate of 4.5 (Mbps), this data is divided into blocks, each in a size to be transferred in 800 (ms), and a set of these blocks are divided into m=3 subsets:

B0=$\{b(3k)|k=0, 1, \ldots\}$

B1=$\{b(3k+1)|k=0, 1, \ldots\}$

B2=$\{b(3k+2)|k=0, 1, \ldots\}$

Then, the block b(3k+j) is stored into the logical disk device with a logical disk device ID number [(k+Hj) modulo 8].

In order to supply this stream in response to the request from the client 7, three unit streams S0, S1 and S2 for supplying B0, B1 and B2 respectively are prepared.

Then, the reference time-slots for the unit streams S0, S1 and S2 are selected such that the transfer start timings of the respective blocks are displaced by 2400/3=800 (ms).

Figure 9:
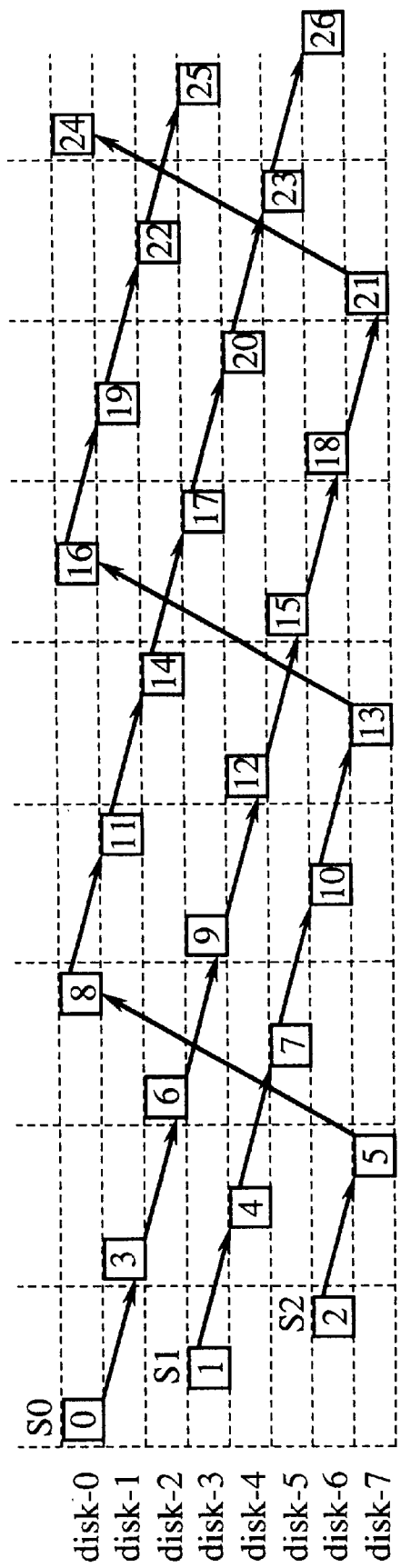
FIG. 9 is a diagram showing exemplary transfer start timings for blocks read out from logical disk devices in a concrete example of the real time stream server of FIG. 3, in a case of using three unit stream.

FIG. 9 shows exemplary transfer start timings for blocks read out from the logical disk devices storing blocks of the unit streams S0, S1 and S2, for an exemplary case of setting H0=0, H1=3, and H2=6.

Similarly, in a case of handling the real time stream data with a data rate of 6 (Mbps), the minimum integer m which satisfies $6 \leq m \times R = m \times 1.6$ (Mbps) is 4, so that it is possible to store and supply the real time stream data with a data rate of 6 (Mbps) by using 4 pieces of unit streams with the block transfer time for one block equal to 600 (ms).

Figure 10:
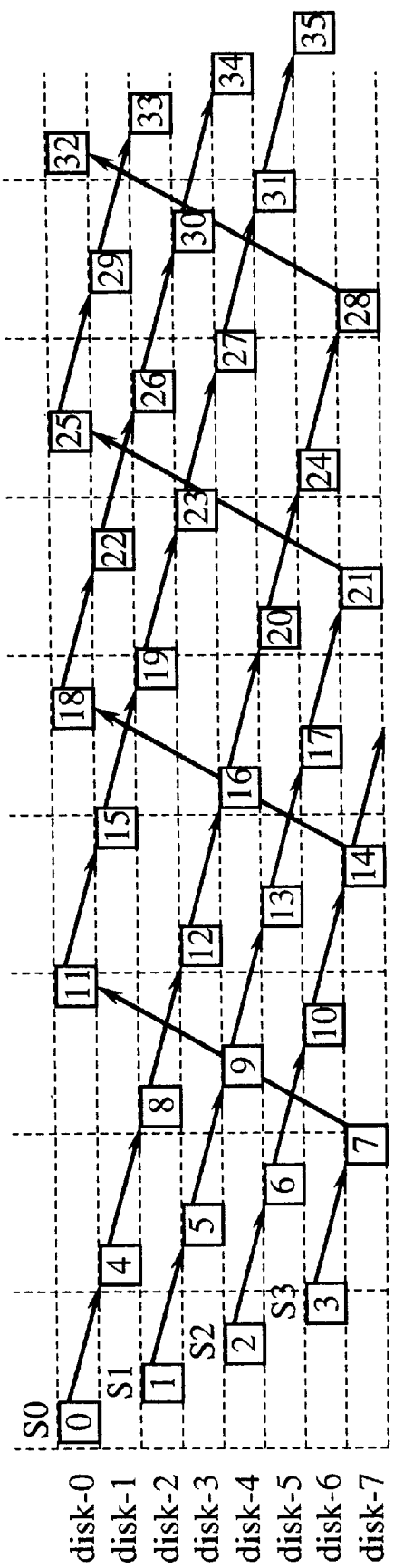
FIG. 10 is a diagram showing exemplary transfer start timings for blocks read out from logical disk devices in a concrete example of the real time stream server of FIG. 3, in a case of using four unit stream.

FIG. 10 shows exemplary transfer start timings for blocks read out from the logical disk devices storing blocks of the unit streams S0, S1, S2 and S3, for an exemplary case of setting H0=0, H1=2, H2=4, and H3=6.

Note that, in the real time stream server of the concrete example described above, a number of unit streams that can be supplied is set as 384, but it is possible to change a number of unit streams to be used arbitrarily according to the request from the client 7 as long as a total number of unit streams to be used is within 384. For example, it is possible to supply 96 sets of streams with a data rate of 6 (Mbps) (corresponding to a total number of unit streams equal to 384) alone, or 48 sets of streams with a data rate of 6 (Mbps) (corresponding to a number of unit streams equal to 192) and 192 sets of streams with a data rate of 1.5 (Mbps) (corresponding to a number of unit streams equal to 192) together.

Next, a manner of selecting the time-slots at the connection request processing unit 21 in the real time stream server 1 of FIG. 3 will be described.

In order to supply the real time stream server with a data rate of m×R, it is necessary to allocate m pieces of disk accesses to the time-slots so that the m pieces of unit streams can be supplied continuously as described above.

Now, as already mentioned above, generally speaking, there are two types of a scheduling scheme for actually allocating a time-slot to a disk access, including a fixed allocation type and a variable allocation type.

The former is the scheduling scheme in which the disk access is fixed to the time-slot which is positioned a certain period of time away relatively from the reference time-slot as shown in FIG. 1. In other words, it is the scheduling scheme which fixes a positional relationship between the transfer timing and the disk access timing on the time-slots.

Figure 2:
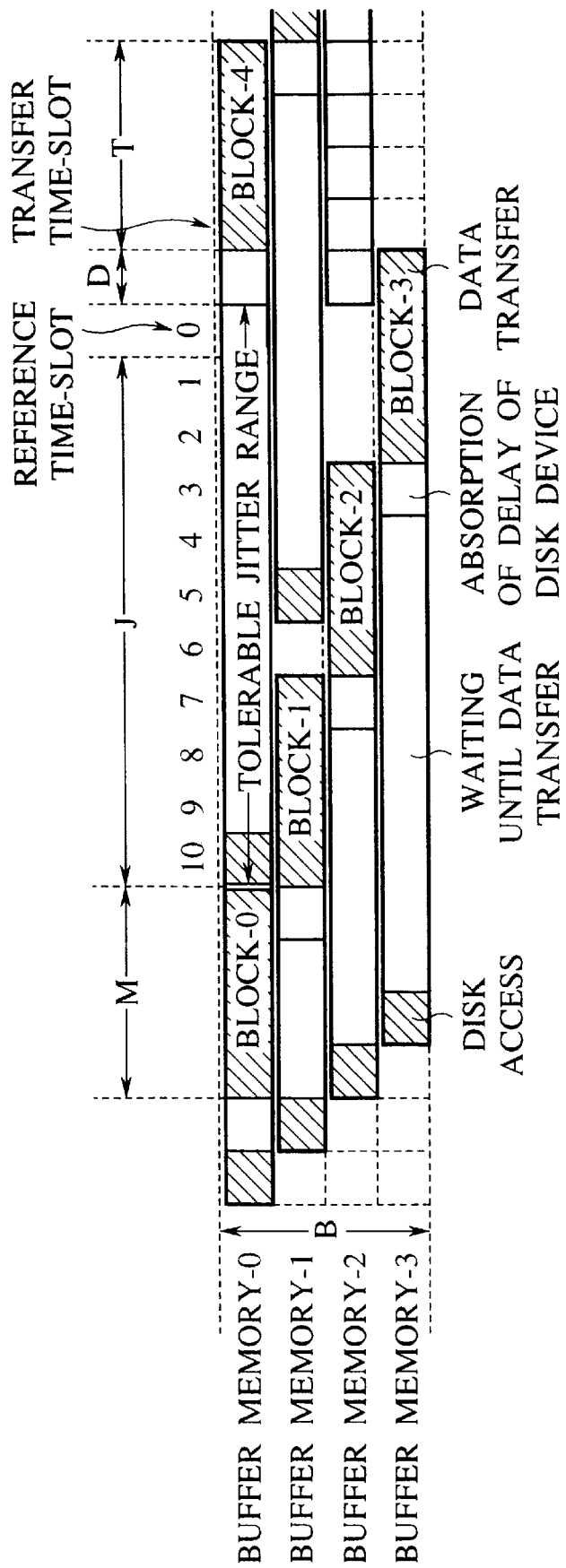
FIG. 2 is a timing chart showing another conventional scheme for managing disk accesses and data transfer timings in a stream scheduling device.

The latter is the scheduling scheme in which the allocation position of the disk access is made variable among the time-slots within the tolerable jitter range as shown in FIG. 2, by noting the fact that a time-slot to which a disk access is to be allocated can be changed during a period since a buffer memory becomes available until a transfer start timing.

Note here that, in FIG. 2, J indicates the maximum jitter number which is determined according to the following formula.

$$J \leq BM - D - T - 1$$

where B is a ratio of a size of a buffer memory that can be used by one stream and a size of one block of the real time stream data, M is a time (a number of slots) for reproducing one block at a client, T is a time (a number of slots) for transferring one block to a client, and D is an estimated maximum delay time (a number of slots) in a case where the disk access end timing extends beyond the end timing of the allocated time-slot. In an example shown in FIG. 2, a time required for transferring one block to the client side and a time required for reproducing one block at the client side are assumed to be equal to each other, as a time equivalent to 4 time-slots.

Now, in the scheduling scheme in which the disk access is fixed to the time-slot which is positioned a certain period of time away relatively from the reference time-slot, depending on a combination of the reference time-slots for already connected unit streams. there can be a case in which the reference time-slots for m pieces of new unit streams overlap with the reference time-slots for the already connected unit streams, no matter how these reference time-slots for m pieces of new unit streams are selected. In such a case, it is impossible to allocate the disk access to the time-slot, and it is impossible to connect a new stream.

In contrast, in the scheduling scheme in which the allocation position of the disk access is made variable among the time-slots within the tolerable jitter range, as long as there is a vacant time-slot within the tolerable jitter range as in a case shown in FIG. 2, it suffices to allocate the disk access of a new unit stream to that vacant time-slot. Also, even when there is no vacant time-slot within the tolerable jitter range, by moving the disk access of the already connected unit stream to another time-slot within its tolerable jitter range, it is possible to create a vacant time-slot and allocate the disk access of a new unit stream to that vacated time-slot.

Even in this case, however, a new stream cannot be connected when it is impossible to create a vacant time-slot no matter how the disk accesses are moved. In order to lower a probability for such a situation to arise, it is preferable to select the reference time-slots such that the reference time-slots of the unit streams are not concentrated in a short period of time as much as possible, that is, the vacant time-slots are as widely spread as possible over all the time-slots.

As described, according to the present invention, the real time stream data with various data rates can be handled by using an appropriate number of independent unit streams according to a data rate of each real time stream data, and therefore it becomes possible to realize the disk access scheduling based on a single scheme regarding a time-slot interval, a block size, a block transfer period, and a buffer memory management, without distinguishing different data rates.

Also, according to the present invention, the stream resources are divided into amounts corresponding to the unit streams, and allocated as much as necessary according to a data rate of each real time stream data to be supplied, so that it becomes possible to utilize the stream resources efficiently without wasting any resource.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A real time stream server, comprising:
   a receiving unit for receiving real time stream data to be stored in the real time stream server;
   a determining unit, communicatively coupled to the receiving unit, for determining a number of unit streams to be used according to a data rate of the real time stream data, each unit stream being defined as a stream which is scheduled by using at least a prescribed block transfer period T, and for determining a block transfer time for the real time stream data according to the number of unit streams to be used and the prescribed block transfer period T;
   a dividing unit, communicatively coupled to the determining unit, for dividing the real time stream data into a plurality of blocks, each block being of a size to be transferred within the block transfer time, and sequentially distributing the blocks among as many unit streams as the number of unit streams to be used;
   a plurality of disk devices for sequentially storing the blocks distributed among the unit streams;
   a buffer memory, communicatively coupled to the plurality of disk devices, for temporarily storing the blocks read out from said plurality of disk devices; and
   a transfer unit, communicatively coupled to the buffer memory, for transferring the real time stream data formed by the blocks read out from the buffer memory to a client through a network, using as many unit streams as the number of unit streams to be used in each block transfer period T.

2. The real time stream server of claim 1, wherein the control unit includes:
   a management unit for managing a directory information for each real time stream data stored in said plurality of disk devices, the directory information indicating the number of unit streams to be used, a disk device ID number of a disk device which stores a top block of each unit stream, and a recording position of each block on a disk device which stores each block, for said each real time stream data.

3. The real time stream server of claim 2, wherein the control unit carries out operations with respect to each real time stream data according to the directory information for each real time stream data managed in the management unit.

4. The real time stream server of claim 1, wherein the control unit includes:
   a scheduling unit for allocating stream resources for as many unit streams as the number of unit streams to be used, scheduling a transfer start timing for each unit stream in order to transfer the blocks continuously in a sequential order to form the real time stream data, and controlling the transfer unit to read out each block of each unit stream on the buffer memory within the block transfer time since the transfer start timing for each unit stream.

5. The real time stream server of claim 4, wherein the scheduling unit schedules the transfer start timing for each unit stream such that scheduled transfer start timings of the unit streams are displaced from one another by the block transfer time.

6. The real time stream server of claim 1, wherein each unit stream is defined as a stream which is scheduled by also using a prescribed block size L and a prescribed time-slot interval I.

7. The real time stream server of claim 1, wherein the determining unit detects a maximum data rate of the real time stream data, and determines the number m of unit streams to be used as a minimum integer which satisfies:

$$\text{the maximum data rate} \leq m \times R$$

where R is a prescribed maximum data rate of each unit stream.

8. The real time stream server of claim 7, wherein the determining unit determines the block transfer time as:

$$\text{the block transfer time} = T/m$$

where T is a prescribed block transfer period, and m is the number of unit streams to be used.

9. The real time stream server of claim 1, wherein the real time stream server has a capacity to supply Cmax sets of real time stream data with data rates not greater than R, where R is a prescribed maximum data rate of each unit stream, and the control unit sets a number of supplies Cm (m=1, 2, . . . ) to be allocated to each real time stream data with a data rate in a data rate range greater than (m−1)×R and not greater than m×R, arbitrarily within a range of:

$$\sum_m (m \times Cm) \leq Cmax$$

where m is the number of unit streams to be used for said each real time stream data.

10. A method for operating a real time stream server having a plurality of disk devices and a buffer memory, comprising the steps of:

entering real time stream data into the real time stream server;

determining a number of unit streams to be used according to a data rate of the real time stream data, each unit stream being defined as a stream which is scheduled by using at least a prescribed block transfer period T, and determining a block transfer time for the real time stream data according to the number of unit streams to be used and the prescribed block transfer period T;

dividing the real time stream data into a plurality of blocks, each block being of a size to be transferred within the block transfer time, and sequentially distributing the blocks among as many unit streams as the number of unit streams to be used;

sequentially storing the blocks distributed among the unit streams into said plurality of disk devices; and transferring the real time stream data formed by the blocks read out from the buffer memory to a client through a network, using as many unit streams as the number of unit streams to be used in each block transfer period T.

11. The method of claim 10, wherein the controlling step includes the step of:

managing a directory information for each real time stream data stored in said plurality of disk devices, the directory information indicating the number of unit streams to be used, a disk device ID number of a disk device which stores a top block of each unit stream, and a recording position of each block on a disk device which stores each block, for said each real time stream data.

12. The method of claim 11, wherein the controlling step carries out operations with respect to each real time stream data according to the directory information for each real time stream data managed by the management step.

13. The method of claim 10, wherein the controlling step includes steps of:

allocating stream resources for as many unit streams as the number of unit streams to be used;

scheduling a transfer start timing for each unit stream in order to transfer the blocks continuously in a sequential order to form the real time stream data; and controlling the real time stream server to read out each block of each unit stream on the buffer memory within the block transfer time since the transfer start timing for each unit stream.

14. The method of claim 13, wherein the scheduling step schedules the transfer start timing for each unit stream such that scheduled transfer start timings of the unit streams are displaced one another by the block transfer time.

15. The method of claim 10, wherein each unit stream is defined as a stream which is scheduled by also using a prescribed block size L and a prescribed time-slot interval I.

16. The method of claim 10, wherein the determining step detects a maximum data rate of the real time stream data, and determines the number m of unit streams to be used as a minimum integer which satisfies:

$$\text{the maximum data rate} \leq m \times R$$

where R is a prescribed maximum data rate of each unit stream.

17. The method of claim 16, wherein the determining step determines the block transfer time as:

$$\text{the block transfer time} = T/m$$

where T is a prescribed block transfer period, and m is the number of unit streams to be used.

18. The method of claim 10, wherein the real time stream server has a capacity to supply Cmax sets of real time stream data with data rates not greater than R, where R is a prescribed maximum data rate of each unit stream, and the controlling step sets a number of supplies Cm (m=1, 2, . . . ) to be allocated to each real time stream data with a data rate in a data rate range greater than (m−1)×R and not greater than m×R, arbitrarily within a range of:

$$\sum_m (m \times Cm) \leq Cmax$$

where m is the number of unit streams to be used for said each real time stream data.

19. The real time stream server of claim 1, wherein each of the unit streams is a data stream at a prescribed reference data rate unit that is utilized internally within the real time stream server.

20. The method of claim 10, wherein each of the unit streams is a data stream at a prescribed reference data rate unit that is utilized internally within the real time stream server.

21. The real time stream server of claim 1, further comprising:
a control unit, communicatively coupled to the plurality of disk devices, for reading out the blocks constituting the real time stream data from said plurality of disk devices to the buffer memory, and reading out the real time stream data from the buffer memory, according to a request for real time stream data that has been sent from the client.

22. The real time stream server of claim 1, wherein the transfer unit sequentially transfers as many blocks as the number of unit streams to be used in each block transfer period T, each block being transferred within the block transfer time, such that the blocks are transferred continuously in a sequential order to form the real time stream data.

23. The method of claim 10, further comprising the step of:
controlling the real time stream server to read blocks constituting the real time stream data from said plurality of disk devices to the buffer memory, and to read out the real time stream data from the buffer memory, according to a request for real time stream data from the client.

24. The method of claim 10, wherein the transferring step sequentially transfers as many blocks as the number of unit streams to be used in each block transfer period T, each block being transferred within the block transfer time, such that the blocks are transferred continuously in a sequential order to form the real time stream data.

* * * * *